（12）United States Patent
Wuest et al.

(10) Patent No.: US 12,271,365 B2
(45) Date of Patent: Apr. 8, 2025

(54) TABLE SCHEMA PROVIDING IMPROVED DATABASE SYSTEM PERFORMANCE

(71) Applicant: SAP SE, Walldorf (DE)

(72) Inventors: Holger Wuest, Linkenheim-Hochstetten (DE); Markus Kahn, Kell am See (DE); Lothar Muessler, Rauenberg (DE); Dirk Endesfelder, Angelbachtal (DE); Markus Riepp, Reilingen (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 18/112,233

(22) Filed: Feb. 21, 2023

(65) Prior Publication Data

US 2024/0281426 A1    Aug. 22, 2024

Related U.S. Application Data

(63) Continuation of application No. 15/462,481, filed on Mar. 17, 2017, now abandoned.

(51) Int. Cl.
  *G06F 16/22* (2019.01)
  *G06F 16/21* (2019.01)

(52) U.S. Cl.
  CPC ........ *G06F 16/2282* (2019.01); *G06F 16/211* (2019.01); *G06F 16/221* (2019.01)

(58) Field of Classification Search
  CPC .................................................. G06F 16/2282
  USPC ......................................................... 707/705
  See application file for complete search history.

(56) References Cited

U.S. PATENT DOCUMENTS

| | | |
|---|---|---|
| 6,072,492 A | 6/2000 | Schagen et al. |
| 6,668,253 B1 | 12/2003 | Thompson et al. |
| 8,595,095 B2 | 11/2013 | Borchardt et al. |
| 8,918,388 B1 | 12/2014 | Chen |
| 8,972,900 B2 | 3/2015 | Rothstein et al. |
| 9,576,025 B1 | 2/2017 | Campo Giralte et al. |
| 2004/0034616 A1* | 2/2004 | Witkowski ............ G06F 16/283 |
| 2004/0068521 A1 | 4/2004 | Haacke et al. |
| 2006/0069632 A1 | 3/2006 | Kahn et al. |

(Continued)

OTHER PUBLICATIONS

"7. Primary Key", Teach ICT, http://www.teach-ict.com/gcse_new/databases/terminology/miniweb/pg7.htm, Accessed on or before: Mar. 16, 2017, 2 pages.

(Continued)

*Primary Examiner* — Muluemebet Gurmu
(74) *Attorney, Agent, or Firm* — Klarquist Sparkman, LLP

(57) ABSTRACT

Techniques and solutions are provided for a table schema that facilitates data denormalization, and which can allow for improved database system performance. Rather than accessing multiple tables, database operations can access a single table, which can reduce the number and complexity of database operations. The table schema includes an attribute subset indicator field. Different values of the attribute subset indicator field can be associated with different contexts, such as different tables or views, which in turn can represent different entity types. A given value of the attribute subset indicator field allows data to be accessed at a coarse granularity, while more-fine grained results can be obtained by providing a value for one or more attribute fields of the table. Different subsets of attributes are retrievable for a given value of the attribute subset indicator field.

20 Claims, 13 Drawing Sheets

(56) References Cited

U.S. PATENT DOCUMENTS

| | | | |
|---|---|---|---|
| 2006/0136526 | A1 | 6/2006 | Childress et al. |
| 2006/0280302 | A1 | 12/2006 | Baumann et al. |
| 2006/0282360 | A1 | 12/2006 | Kahn et al. |
| 2007/0124276 | A1 | 5/2007 | Weissman et al. |
| 2007/0288374 | A1 | 12/2007 | Borchardt et al. |
| 2008/0282189 | A1 | 11/2008 | Hoffmann et al. |
| 2009/0019446 | A1 | 1/2009 | Braun et al. |
| 2009/0313157 | A1 | 12/2009 | Kahn et al. |
| 2009/0327106 | A1 | 12/2009 | Bartelt et al. |
| 2010/0057670 | A1* | 3/2010 | Bates ................ G06F 16/2343 707/E17.017 |
| 2010/0131321 | A1 | 5/2010 | Riepp et al. |
| 2010/0153297 | A1 | 6/2010 | Haaf et al. |
| 2011/0093469 | A1 | 4/2011 | B'Far et al. |
| 2011/0173203 | A1 | 7/2011 | Jung et al. |
| 2011/0173220 | A1 | 7/2011 | Jung et al. |
| 2012/0110034 | A1 | 5/2012 | Baumann et al. |
| 2012/0117000 | A1 | 5/2012 | Haaf et al. |
| 2012/0233091 | A1 | 9/2012 | Kahn et al. |
| 2013/0090974 | A1 | 4/2013 | Braun et al. |
| 2013/0275365 | A1 | 10/2013 | Wang et al. |
| 2013/0290168 | A1 | 10/2013 | Kahn et al. |
| 2014/0058905 | A1 | 2/2014 | Kahn et al. |
| 2014/0058906 | A1 | 2/2014 | Kahn et al. |
| 2014/0058907 | A1 | 2/2014 | Kahn et al. |
| 2014/0143178 | A1 | 5/2014 | Haaf et al. |
| 2014/0258053 | A1 | 9/2014 | Lange et al. |
| 2015/0278937 | A1 | 10/2015 | Kahn et al. |
| 2016/0092048 | A1 | 3/2016 | van den Brock et al. |
| 2017/0212897 | A1* | 7/2017 | Chandler ............ G06F 16/2282 |
| 2018/0004805 | A1* | 1/2018 | Potter ................... G06F 16/22 |
| 2018/0268028 | A1 | 9/2018 | Wuest et al. |
| 2018/0314737 | A1* | 11/2018 | Chong ................ G06F 16/2456 |
| 2019/0073388 | A1 | 3/2019 | Desmarets |
| 2019/0384861 | A1* | 12/2019 | Ghoting ............... G06Q 10/105 |

OTHER PUBLICATIONS

"A database dictionary", *Geekgirls' Plain-English Computing*, http://www.geekgirls.com/2010/02/a-database-dictionary/, Published on: Feb. 28, 2010, Accessed on or before: Mar. 16, 2017, 3 pages.

"Can Multiple Primary Keys Exist on a Single Table?", *Chartio*, https://chartio.com/resources/tutorials/can-multiple-primary-keys-exist-on-a-single-table/, Accessed on or before: Mar. 16, 2017, 5 pages.

"Definition of: key field", *PCMag Encyclopedia*, http://www.pcmag.com/encyclopedia/term/45766/, Accessed on or before: Mar. 16, 2017, 1 page.

"Denormalization", *Wikipedia*, https://en.wikipedia.org/wiki/Denormalization, Last updated: Oct. 31, 2016, Accessed on or before: Mar. 16, 2017, 2 pages.

"Foreign key", *Wikipedia*, https://en.wikipedia.org/wiki/Foreign_key, Last updated: Jan. 11, 2017, Accessed on or before: Mar. 16, 2017, 6 pages.

"How to insert multiple rows for a single primary key?", *Stack Overflow*, http://stackoverflow.com/questions/725695/how-to-insert-multiple-rows-for-a-single-primary-key, Accessed on or before: Mar. 16, 2017, 2 pages.

"2 Partitioning Concepts", *Oracle Help Center, Database VLDB and Partitioning Guide*, https://docs.oracle.com/cd/B28359_01/server.111/b32024/partition.htm, Accessed on or before: Mar. 16, 2017, 17 pages.

"SQL—Joining more than 2 tables", CodingForums.com, http://www.codingforums.com/other-server-side-languages-issues/398-sql-joining-more-than-2-tables.html, Accessed on or before: Mar. 16, 2017, 4 pages.

"SQL Foreign Key Constraint", w3schools.com, https://www.w3schools.com/sql/sql_foreignkey.asp, Accessed on or before: Mar. 16, 2017, 5 pages.

"What is a Relational Database View?" *Essential SQL*, https://www.essentialsql.com/what-is-a-relational-database-view/, Accessed on or before: Mar. 16, 2017, 4 pages.

Ambler, Scott, "Choosing a Primary Key: Natural or Surrogate?" *Agile Data*, http://www.agiledata.org/essays/keys.html, Accessed on or before: Mar. 16, 2017, 4 pages.

Hilker, Steve, "Data Warehousing—Fact and Dimension Tables", *Toad World*, https://www.toadworld.com/platforms/sql-server/w/wiki/9546.data-warehousing-fact-and-dimension-tables, Last updated: Apr. 29, 2013, Accessed on or before: Mar. 16, 2017, 3 pages.

"Database normalization," retrieved from https://en.wikipedia.org/wiki/Database_normalization, on or before Mar. 14, 2017, 6 pages.

Non-Final Office Action received in U.S. Appl. No. 15/462,481, filed Mar. 17, 2020, 24 pages.

Final Office Action received in U.S. Appl. No. 15/462,481, filed Sep. 18, 2020, 30 pages.

Non-Final Office Action received in U.S. Appl. No. 15/462,481, filed Jan. 6, 2021, 36 pages.

Non-Final Office Action received in U.S. Appl. No. 15/462,481, filed May 12, 2022, 43 pages.

Final Office Action received in U.S. Appl. No. 15/462,481, filed Nov. 22, 2022, 51 pages.

* cited by examiner

TABLE SCHEMA PROVIDING IMPROVED DATABASE SYSTEM PERFORMANCE

CROSS REFERENCE TO RELATED APPLICATIONS

This application is a continuation of U.S. patent application Ser. No. 15/462,481, filed on Mar. 17, 2017, now abandoned, which is hereby incorporated by reference herein.

BACKGROUND

Advances in computing technology enable ever increasing amounts of data to be collected and analyzed. Database processing loads can vary at different times. For example, a database workload may be characterized by periods of routine use, such as for day-to-day transaction processing, and periods of heavy use, such as during processing at the end of a defined period (such as end-of-month, end-of-quarter, or end-of-year calculations). During periods of heavy use, database performance may be drastically reduced.

Accordingly, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as one or more computer-readable media comprising computer-executable instructions that when executed cause a computing system to perform processing to generate a contexed agglomerate table, which is also referrable to as a "semantic cluster table," as described in U.S. patent application Ser. No. 15/462,481 (U.S. Patent Publication No. 2018/0268028), filed Mar. 17, 2017, which is incorporated by reference herein in its entirety. The processing comprises storing data in a contexed agglomerate table. The contexed agglomerate table comprises a technical key field, each row of the contexed agglomerate table comprises a unique technical key. The contexed agglomerate table also includes a context indicator field. The contexed agglomerate table comprises a plurality of context indicator field values, each context indicator field value being associated with a unique semantic context. The contexed agglomerate table also includes a plurality of key figure fields. Each of the plurality of unique semantic contexts is uniquely associated with one or more of the plurality of key figure fields. The plurality of context indicator field values allow the one or more key figures fields with which a context indicator field value is uniquely associated to be retrieved from the contexed agglomerate table by selection of data associated with the respective context indicator field value.

An embodiment can be implemented as a system comprising memory; one or more hardware processors coupled to the memory; and one or more computer-readable media storing instructions that, when loaded into the memory, cause the one or more hardware processors to perform operations for executing a database process comprising a plurality of requests for a database operation. The operations also include receiving a contexed agglomerate table from a database system. The contexed agglomerate table comprises a context indicator field, also referrable to as a "a semantic indicator field," (as described in U.S. patent application Ser. No. 15/462,481 (U.S. Patent Publication No. 2018/0268028), filed Mar. 17, 2017, incorporated by reference herein), having a plurality of values. Each value is associated with a unique semantic context. The contexed agglomerate table also comprises a plurality of attribute fields and a plurality of key figure fields. Each semantic indictor field value is uniquely associated with at least one of the plurality of key figure fields. The operations further include executing a plurality of queries of the database process on the contexed agglomerate table. Each of the plurality of queries comprises a different combination of one or more of the plurality of context indicator field values, one or more of the plurality of attribute fields, or combinations thereof.

An embodiment can be implemented as a method carried out at least in part by a computing system, the method comprising receiving a plurality of concurrent requests for a database operation, the plurality of requests associated with a database process. The plurality of concurrent requests are executed on a contexed agglomerate table. The contexed agglomerate table comprises a context indicator field having a plurality of values. Each value is associated with a unique semantic context. The contexed agglomerate table also includes a plurality of attribute fields and a plurality of key figure fields. Each context indicator field value is uniquely associated with at least one of the plurality of key figure fields. A plurality of queries of the database process are executed on the contexed agglomerate table. Each of the plurality of queries comprises a different combination of one or more of the plurality of context indicator field values, one or more of the plurality of attribute fields, or combinations thereof.

The various innovations can be used in combination or separately. As described herein, a variety of other features and advantages can be incorporated into the technologies as desired. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Example 1—Example Overview

Figure 1:
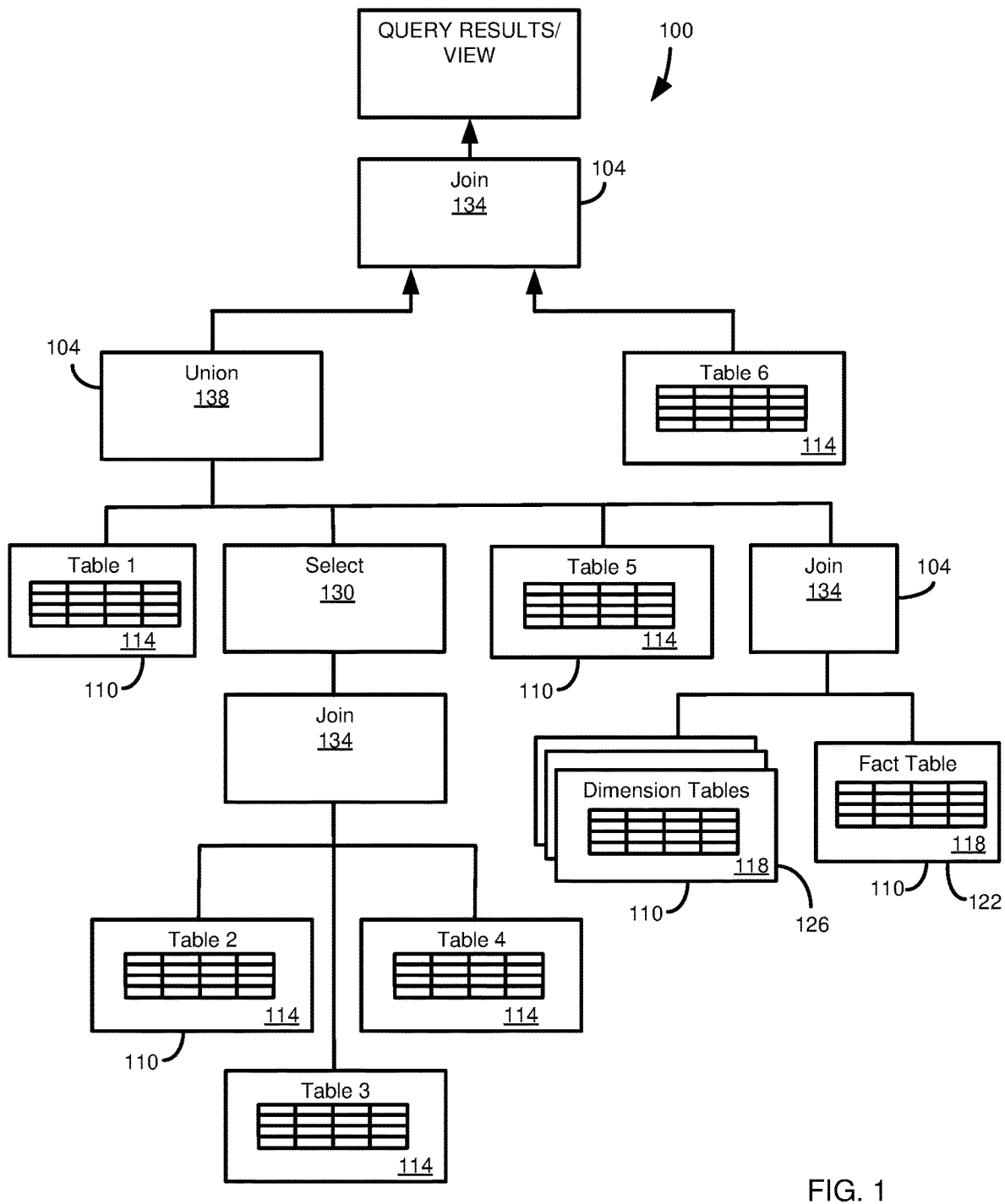
FIG. 1 is a schematic diagram depicting a query processing operation tree that includes a plurality of database tables and a plurality of query operations.

Advances in computing technology enable ever increasing amounts of data to be collected and analyzed. Database processing loads can vary at different times. For example, a database workload may be characterized by periods of routine use, such as for day-to-day transaction processing, and periods of heavy use, such as during processing at the end of a defined period (such as end-of-month, end-of-quarter, or end-of-year calculations). During periods of heavy use, database performance may be drastically reduced.

Performance can be reduced, in some cases, because of normalization of database data. Data normalization typically involves partitioning data into a larger number of simpler tables, rather than aggregating data into a single, large, complex table. Normalization can include partitioning data based on the relatedness of database fields (e.g., column categories/identities). Relatedness can include how likely the fields are to be accessed in particular database operations, such as data manipulation (DML) statements to update, insert, or delete database records, or database queries, such as specified in the structured query language (SQL). Normalized tables often more accurately reflect analog world concepts, and can be more intuitive for users to work with. Normalization has been an increasingly used foundation of database systems for several decades.

However, normalization can provide undesirable side effects. That is, normalization typically results in multiple, smaller tables than data that has not been normalized. The use of smaller tables can increase the number and complexity of database operations, which can negatively affect database performance, including increasing processor use, use of network resources (since more communications may be required between a computing system executing an application and a computing system providing a database system), and the execution time of database operations.

Parallelism has been another trend in the design of computing systems and software, including as applied to database systems. As increasingly large amounts of data are processed, it is common to split processing into multiple jobs or packages, and process at least a portion of the jobs or packages concurrently. As an example, if a million documents are to be processed, they might be split into one-thousand jobs or packages, each containing one-thousand documents to be processed. The jobs may then be processed concurrently by multiple application servers, for example.

Like normalization, parallelism can also provide undesirable side effects. If the number of concurrent requests to a database system is too high, performance can be drastically reduced. As parallelism is typically used with normalized database tables, it is common for database processing to involve multiple concurrent requests, with each of the requests accessing multiple tables, often with complex queries (which can increase processor use and processing time).

The present disclosure provides innovations in database processing that can greatly reduce processing time a resource use. The innovations can include the use of denormalized or unnormalized database tables. Denormalized tables can refer to tables that have been denormalized compared to a prior organization of the underlying data. For example, denormalization can include combining multiple tables, or at least some of the information in such tables, into a single table. Unnormalized tables can refer to tables where data has not been specifically rearranged to remove normalization, but where the data is not normalized. For convenience, "denormalized" is used herein to refer to both denormalized data and unnormalized data. As used herein, a "contexed agglomerate table" can refer to a table having denormalized data or unnormalized data.

In order to help reduce any disadvantages that may result from the use of non-normalized data (e.g., update, insertion, or deletion anomalies), as well as to further increase performance, denormalized tables can be organized based on multiple semantic contexts. These denormalized tables can be referred to as "contexed agglomerate tables." In some cases, a contexed agglomerate table can include fields for multiple database semantics. The semantics included in the contexed agglomerate table can access the same or overlapping database records, and database fields. Some or all of the records and fields, in some aspects, can differ between semantic contexts. The different semantics in a table can represent, for example, different categories of queries or calculations (or combinations thereof) performed on a common or overlapping set of database records. These queries or calculations may be part of a related analog world process.

Contexed agglomerate tables include one or more context indicator fields. In particular aspects, a contexed agglomerate table includes a single context indicator field. Each context indicator field can include one or more, typically including a plurality of, context indicator field values. Each context indicator field value can be used to identify a particular semantic context associated with a particular type of data object or data entity (e.g., a logical data object, such as a BusinessObject of SAP SE, of Walldorf, Germany). Thus, a context indicator value may indicate a data entity or type representing a customer, account, contract, etc., or a particular characteristic thereof. For instance, data object or entity types, represented by a context indicator field values, may represent various models or analyses of an entity, such as analyzing different measure of risk associated with a contract or service agreement.

Traditionally, a normalized table would be created for each entity or object corresponding to a context indicator value. That is, there would be separate tables for each logical data object type. According to the innovations of the present disclosure, a denormalized contexed agglomerate table includes multiple semantic contexts (e.g., logical data object types). The context indicator field value is used for selectively retrieving or accessing data associated with a particular semantic context indicated by a context indicator field value.

In at least some cases, the context indicator field, and its values, are used only for selectively accessing data based on a semantic context. That is, a context indicator field value may be not otherwise related to the data in a particular record, and the particular semantic field value can be arbitrarily assigned. That is, any value can be assigned to represent a particular semantic context, so long as it is uniquely associated with the semantic context (or, in some cases, multiple semantic contexts, but less than all of the semantic contexts, where context indicator values for each of multiple context indicator fields can be used to uniquely identify a particular semantic context, at varying levels of granularity).

The use of contexed agglomerate tables can improve database processing by reducing the number of requests made to the database system. For example, rather than carrying out multiple concurrent database operations for multiple tables, the concurrent database operations can be carried out for a single table—reducing the number of requests. In addition to reducing the number of requests, because the database operations can be simplified (e.g., a simple SELECT statement rather than complex or expensive SQL operations, such as UNION, JOIN, or multiple SELECT operations), processor use, and processing time, can be reduced. The use of a single table allows for aggregated reading of the table (e.g., combining values from multiple rows), allowing for fewer lines of data to be transferred.

In some cases, at least a portion of database requests resulting from parallelism or concurrency can reduced or eliminated. For example, a contexed agglomerate table can be read by an application, and concurrent access to the data provided at the application or logical layer, rather than having all requests be sent to the database layer. If desired, multiple copies of the contexed agglomerate table can be made at the application layer, such as to improve read or write performance.

The use of a single table can provide additional advantages. For example, a single table can allow for higher compression rates (either compression on a persistent storage medium or in-memory compression). In particular, because of its structure, further detailed below, contexed agglomerate tables are typically sparsely filled, which can allow for high compression.

A single table can also reduce the overall data volume associated with the data. For example, rather than having multiple technical keys fields associated with multiple tables, a single table can have a single technical key field. This can allow for shorter primary keys to be used, in both the table and database table indices. That is, the primary key can be the technical key, rather than a key composed of multiple fields, while the semantic can be preserved with a semantic key, which can be used to identify a table entry. The shorter technical, primary key can be used for database management, and the primary index, reducing database management overhead. Read operations can use the semantic key. In addition, the contexed agglomerate table typically has the same, or a similar, number of rows as the sum of normalized tables. Thus, consolidation into a single table does not create significant additional data volume.

The single contexed agglomerate table can increase scalability of an application or database system by reducing the workload on the database server, reducing CPU use. Run time can be reduced by lowering the complexity of the database operations and reducing transfers between a computing system executing an application and the database server.

Example 2—Example Database Query Processing Operation Tree

FIG. 1 is diagram schematically depicting an example of a query processing operation tree 100. The tree 100 is provided as an example of query operations 104 that may be carried out in conducting a query of the type that may access many tables, and may be carried out for concurrent processes, and thus may result in many requests to a database system. The innovations are not limited to any particular query structure, or other types of database operations. Although query operations are depicted, the present disclosure can be used in database processes that manipulate database data (e.g., using DML statements).

As shown in FIG. 1, the query operations 104 can access multiple tables 110. The database tables 110 can be maintained in any suitable format, such as a row store, where database information is stored as sequential row elements, or a column store, where database information is stored as sequential column elements. However, the present innovations are not limited to row stores or column stores, or database information maintained in tables. For example, the disclosed innovations can be used with data stored in a document format (e.g., JavaScript Object Notation or XML), key-value format, or graph format. In some cases, database data can be stored and accessed entirely in memory (although, the database data can also be persisted), while in other cases all or a portion of the accessed data may be located in a persistent storage medium (e.g., hard disk).

The tables 110 can be stored in the same format, or can be stored in different formats. The query operations 104 are shown as accessing tables 114, which can be row store tables (e.g., tables used for online transaction processing (OLTP) database operations). The query operations 104 are also shown as accessing tables 118, which can be column store tables (e.g., fact tables 122 and dimension tables 126 associated with online analytical processing (OLAP)).

The query operations 104 are shown as including typical SQL operations, including SELECT 130, JOIN 134, and UNION 138 operations. SQL operations can be associated with varying costs, which can include CPU resources expended in carrying out the SQL operations and the time cost of executing such operations. For instance, while SELECT operations 130 are typically low cost operations, UNION operations 138, and more particularly cross-table JOIN operations 134, are typically expensive, high-cost operations.

In addition to including multiple types of SQL operations, a query operation tree 100 can include multiple operations of each type. For example, the tree 100 is shown as including multiple JOIN operations 134, which can result in the tree particularly time and resource intensive.

Innovations described in the present disclosure can provide for structuring database information in a way that reduces or eliminates the need for expensive SQL operations, and can reduce the number of SQL operations that need to be executed by a database system. For example, rather than using expensive JOIN and UNION operations, the database information can be organized such that it can be retrieved using SELECT statements.

Example 3—Example Process with Concurrent Database Operations

Figure 2:
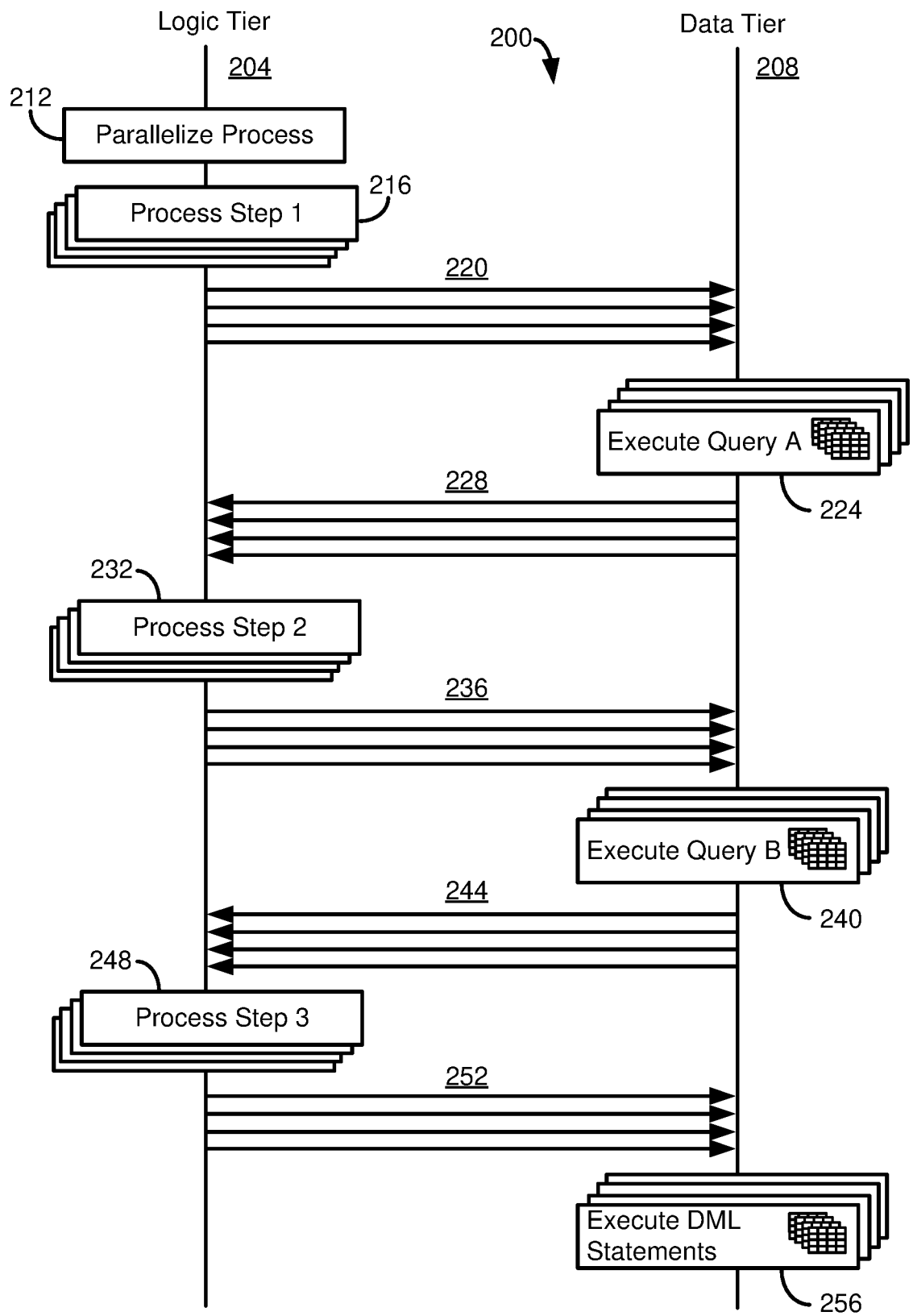
FIG. 2 is a diagram illustrating operations occurring at a logic tier and a data tier during concurrent execution of database operations associated with a parallelized process.

As explained above, in addition to including complex queries that can have multiple expensive SQL operations (such as described with respect to FIG. 1), a query, or other database processes (e.g., a process including DML statements), can be split into multiple jobs or packages that can be executed concurrently. For example, a database process may have multiple steps or tasks (e.g., queries, DML statements, or combinations thereof), with the steps/tasks being carried out concurrently for different packages (or job) of data to be processed. FIG. 2 is a block diagram of an example process 200 having multiple steps, each step including a plurality of concurrently executed jobs or packages.

The process 200 includes operations occurring at a logic tier 204 (which may be executing an application and may include multiple application servers for concurrently handling jobs or packages in a database process or step(s) thereof) and a data tier 208 (such as a database system, which may be a multi-threaded or multi-process database system capable of concurrently processing requests for a plurality of database clients, including a plurality of application servers for a particular application of the logic tier 204).

At 212, a database process, such as a process including one or more steps or tasks (e.g., DML statements, queries, or combinations thereof), is split into a plurality of jobs or packages. In a particular example, the splitting of the processes into jobs can be carried out by a parallelization component, such as the Framework for Parallel Processing of the HANA database system of SAP SE, of Walldorf, Germany. In addition to splitting the process into a plurality of jobs, the parallelization component can oversee job execution, including merging task results.

At 216, the logic tier 204, such as using the parallelization component, carries out a first step of the process. The first step of the process can be, for example, a first database query, query A. However, the first process step could include multiple queries, one or more DML statements, or a combination of one or more queries or one or more DML statements. Process step 1 is carried out concurrently for a plurality of jobs or packages.

In executing process step 1, a plurality of application servers can issue a plurality of concurrent database requests 220 to the data tier 208. The plurality of database requests associated with process step 1 are executed at the data tier 208 at 224. For example, process step 1 may involve the execution of query A. Query A can include a plurality of SQL statements (e.g., UNION, SELECT, JOIN). A plurality of execution results 228, such as read results, can be returned to the logic tier 204.

A second step of the process is carried out at the logic tier 204 at 232. Process step 2 is carried out concurrently for a plurality of jobs or packages. The logic tier 204 issues a plurality of concurrent database requests 236 to the data tier 208. The plurality of database requests associated with process step 2 are executed at the data tier 208 at 240. For example, process step 2 can include a query B, which can contain a plurality of SQL statements. A plurality of execution results 244 are returned to the logic tier 204 by the data tier 208.

A third process step is carried out by the logic tier 204 at 248. A plurality of concurrent database requests 252 associated with process step 3 are sent to the data tier 208 by the logic tier 204. The plurality of database requests 252 are executed by the data tier 208 at 256. For example, the database requests can include one or more DML statements.

As illustrated in FIG. 2, execution of process 200 can include multiple process steps, each including multiple communications between the logic tier 204 and the data tier 208. Compared to a process with a single execution thread, the process 200 can use significantly more network resources. Each of the steps also results in a plurality of concurrent database requests to be processed at the data tier 208. Even using multi-threading or other types of multiprogramming, the performance of the data tier 208 can be reduced compared with a single database request. In at least some cases, the reduction in database performance can be proportional to the number of concurrent requests associated with a step of the process 200.

Example 4—Contexed Agglomerate Table

As explained in Examples 1-3, concurrent execution of complex queries (or other database processes) can drastically reduce database system performance. In part, this performance drop can result from normalization of database data. According to the present disclosure, all or a portion of database data can be organized in denormalized tables (or other types of denormalized database formats, such as documents). The denormalized tables can include semantic information, allowing data associated with one or more particular semantics to be selectively accessed in the table.

Figure 3:
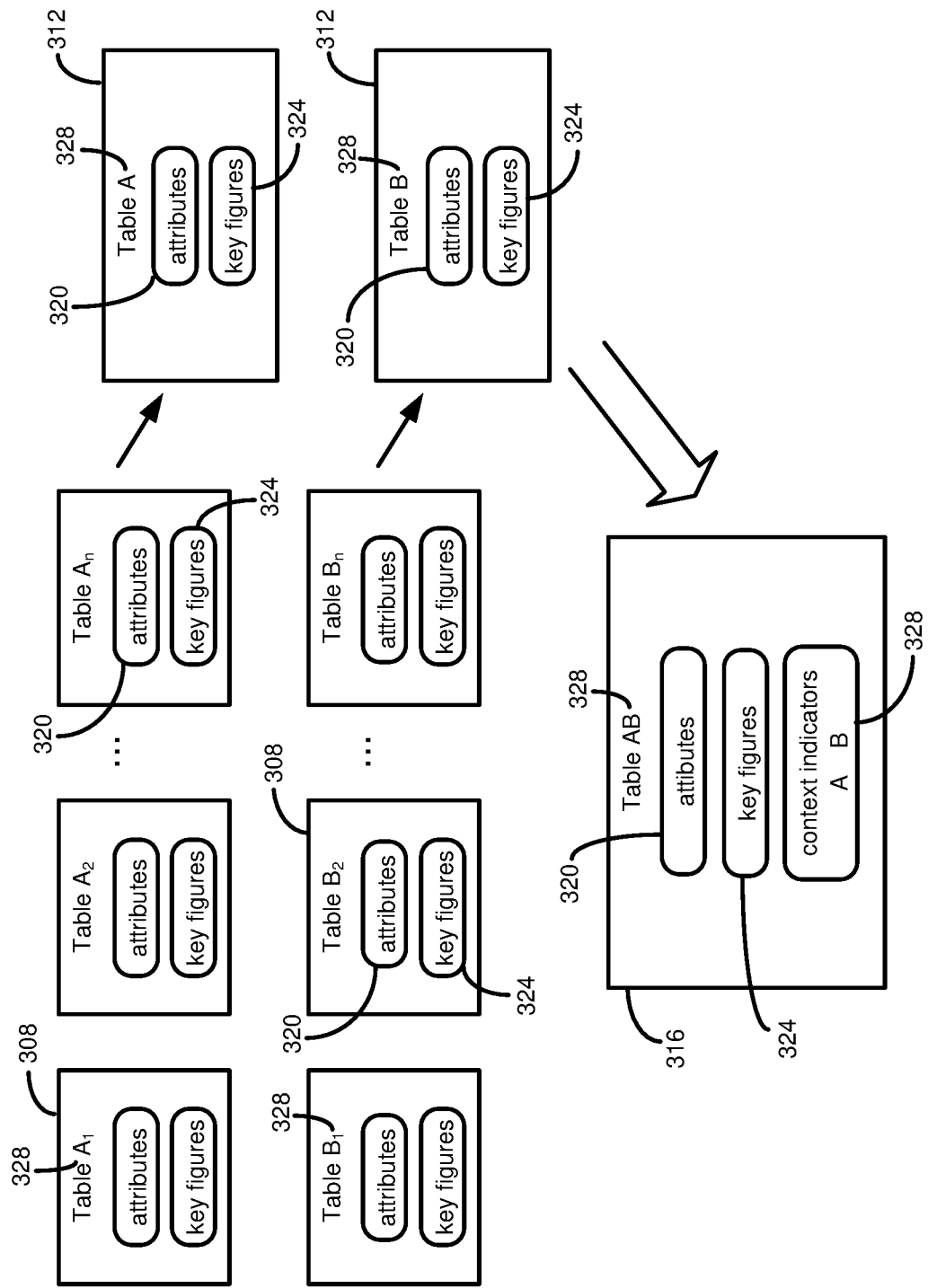
FIG. 3 is a diagram schematically depicting a contexed agglomerate table and corresponding partially and fully normalized tables.

FIG. 3 illustrates a plurality of fully normalized tables 308, a plurality of partially normalized tables 312, and a denormalized contexed agglomerate table 316. As discussed above, the trend in database design has been toward increased data normalization, such as represented by tables 308. Unlike prior normalized tables, tables 308 are shown with two, lower (or coarser) granularity context indicators A and B, which can indicate a semantic context (for example, a particular category of documents or processing). Although two context indicators are shown, it should be appreciated that a larger number of context indicators could be used. Each of the tables 308 can represent a single result (e.g., more granular) result category within a semantic context. That is, each of the tables $A_1 \ldots A_n$ and $B_1 \ldots B_n$ can represent a single result category in the overall semantic context associated with context indicator A and context indicator B, respectively.

As shown, each of the tables 308 includes one or more attributes 320 and one or more key figures 324. At least some of the attributes 320 and key figures 324 can be common to multiple, including all, of the tables 308 associated with a particular context indicator. In further examples, at least some of the attributes 320 and key figures 324 can be common to multiple, including all, of the tables 308 associated with multiple, including all, of the context indicators. However, at least some of the attributes 320 and key figures 324 are unique to each table 308. These unique attributes 320 and key figures 324 can be used to access information associated with a table 308, even if the data for the table is combined with data from other tables, having either the same or different context indicators.

For example, tables 308 for context indicator A, $A_1 \ldots A_n$, can be combined into the partially normalized table 312 for context indicator A. However, data for one or more of the tables 308 associated with context indicator A can be selectively retrieved by appropriate selection of the attributes, such as in a SQL statement. Attributes associated with a single table 308 can be used to select data for only that table. Attributes associated with multiple tables 308 (or all tables) can be used to select data at a coarser granularity.

The context indicators allow this concept to be extended, combining the partially normalized tables 312 into the denormalized contexed agglomerate table 316. Contexed agglomerate table 316 includes the attributes 320 and key figures 324 from each of the partially normalized tables 312, which include the attributes and key figures from their constituent normalized tables 308. The contexed agglomerate table 316 also includes all of the context indicators 328 from its constituent partially normalized tables 312.

Data can be selectively retrieved from the contexed agglomerate table 316 by appropriate selection of attributes 320, context indicators 328, or a combination thereof. For example, data for attributes common to at least some of the tables 308 for multiple context indicators can be retrieved by selecting data with those attributes, but not restricting the data to a particular context indicator 328. If data for one or more particular context indicators 328 is desired, the context indicator can be used as a selection criteria (in which case the data retrieved will be equivalent to the partially normalized table 312 for the selected context indicator(s)) or one or more context indicators and one or more attributes can be used in combination as selection criteria, in which case a portion of the data from one or more of the partially denormalized table 312 will be retrieved (corresponding to at least some of the data from one or more of the tables 308 for the selected context indicator(s)).

Although FIG. 3 illustrates normalized tables 308, partially normalized tables 312, and the denormalized contexed agglomerate table 316, it should be appreciated that the present disclosure does not require that the normalized tables 308 and partially normalized tables 312 be used. The tables 308 and 312 are used primarily for illustrative purposes. However, the present disclosure does not exclude systems that include the normalized tables 308 and partially normalized tables 312, provided that the system also includes the contexed agglomerate table 316.

Example 5—Example Contexed Agglomerate Table Definition

Figure 4:
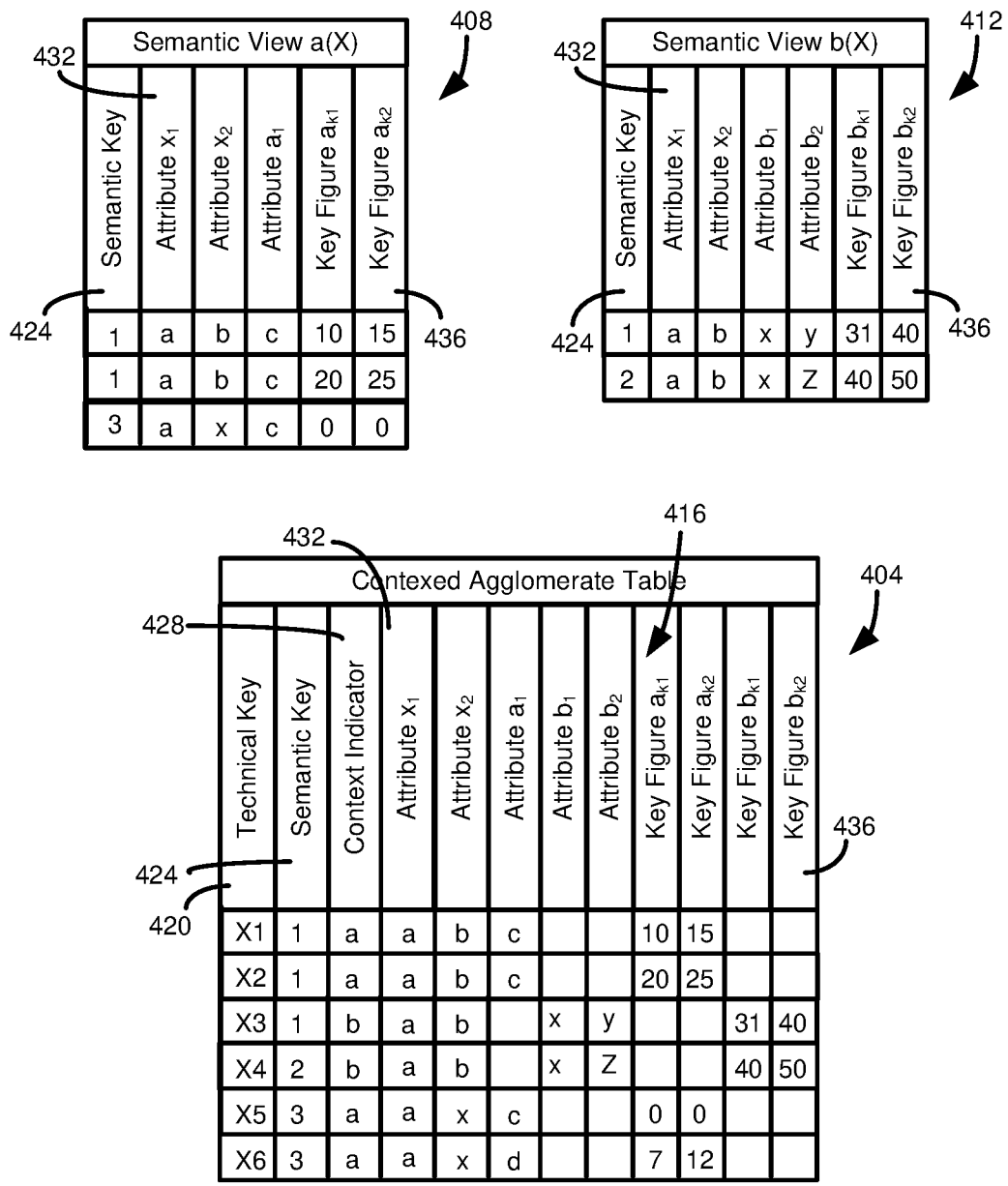
FIG. 4 is a diagram of an example contexed agglomerate table and two semantic views that can be represented therewith.

FIG. 4 illustrates a particular example of a contexed agglomerate table 404 that can correspond to two database views 408, 412. In at least some cases, the database views 408, 412 are not materialized. That is, the database views 408, 412 can be used to help guide the contents to be included in the contexed agglomerate table 404, but are not stored or populated. In other cases, the database views 408, 412 can be traditional database views. For example, the database views can be query results that can themselves be subject to additional database operations (e.g., SQL statements).

The contexed agglomerate table 404 can include a plurality of database fields 416. The database fields 416 can include technical keys 420, semantic key field(s) 424, context indicators 428, attributes 432, and key figures 436. Technical keys 420 can be identifiers used to uniquely identify a particular row of the contexed agglomerate table 404. For example, the technical key can be an arbitrary (e.g., having no relation to the data stored in the database record, but can be sequentially assigned, for instance) value, such as an integer.

The semantic key field(s) 424 can be used to uniquely identify another database record referenced by the row indicated by the technical key 420. For example, the semantic key can be a single, unique field in the record, or can be a composite key (e.g., a compound or concatenated key) formed from multiple fields of the record. The semantic key field(s) 424 can be used to identify a particular document, contract, account, individual, etc. That is, the semantic key field can be a foreign key for another database record, such as a record in another table. As shown in FIG. 4, multiple rows of the contexed agglomerate table 404 can refer to the same record, and can be associated with the same context indicator 428 or a different context indicator.

Although contexed agglomerate table 404 is shown as including a single semantic key 424, in some implementations, the contexed agglomerate table can include multiple semantic keys. For example, certain context indicators 428 may be associated with different semantic keys 424 than other context indicators.

The context indicators 428 can be associated with one of the views 408, 412. Although, as mentioned above, the views 408, 412 may not necessarily be defined in the database system, the context indicators 428 can allow database operations, such as queries, to access database fields associated with one or more context indicators. Thus, the context indicators 428 can serve to segregate or identify information in the contexed agglomerate table 404 that would typically be represented in multiple, normalized tables. The context indicators 428 allow a single table to be used to provide information related to multiple semantics, while also allowing database operations to access only the data associated with the context indicators specified. By retrieving a single table from the database system, or writing to a single table, and using the context indicators (e.g., via SELECT statements) to reconstitute normalized data, fewer, and less complex, database system operations can be sent to the database system, which can increase the performance of the database system.

Attributes 432 can provide descriptive context for key figures 436. Attributes 432 can be attributes used to form a dimension in an OLAP database system. However, attributes 432 need not be in a dimension table, or in an OLAP system (e.g., attributes can be used in an OLTP database system, and can be included in tables that also include key figures 436, or measure or facts). As an example, a key FIG. 436 might be the number of units of an item sold, while the corresponding attributes 432 might be the cost of the item, a description of the item, an item number, and supplier information.

As will be further explained, attributes 432 can be used along with the context indicators 428 to select other data, such as key figures 436, at different levels of granularity. The contexed agglomerate table 404 can include attributes 432 and key figures 436 that are that are common to the database views 408, 412, attributes and key figures that are only in one of the database views, attributes and key figures that are not present in either view, or a combination thereof.

Database view 408 and database view 412 both include attributes $x_1$ and $x_2$, which are included in the contexed agglomerate table 404. Database view 408 includes a single attribute, $a_1$, which is in the contexed agglomerate table 404, but not in the database view 412. Database view 412 includes two attributes, $b_1$ and $b_2$, which are in the contexed agglomerate table 404, but are not in the database view 408. Each database view 408, 412 has different key figures, represented in the contexed agglomerate table 404. Database view 408 has key figures $a_{k1}$ and $a_{k2}$, while database view 412 has key figures $b_{k1}$ and $b_{k2}$. Although the database views 408, 412 are shown having different key figures, in some cases, the views could have at least some key figures that are the same.

The attributes 432, and context indicators 428, can be used to select particular key figures 436 (or other fields) of the contexed agglomerate table 404. The number of attributes 432 and context indicators 428 used to select data (e.g., via a WHERE statement) can determine the granularity with which data is retrieved from the contexed agglomerate table 404. For example, all key figures associated with context indicator 'a' can be selected with WHERE SemanticIndicator='a'. However, values in distinct rows may be lost (e.g., combined with values from other rows) because of the low (coarse) granularity of the selection. The values of individual rows, or smaller combinations of rows, can be retained by adding additional attributes 432 (or, a context indicator 428, if not already included) to the SELECT statement. For instance, a SELECT statement of WHERE SemanticIndicator='a' AND Attribute $a_1$='d' will retrieve data for a single row (having a technical key of X6).

Example 6—Example Contexed Agglomerate Table Formation Method

Figure 5:
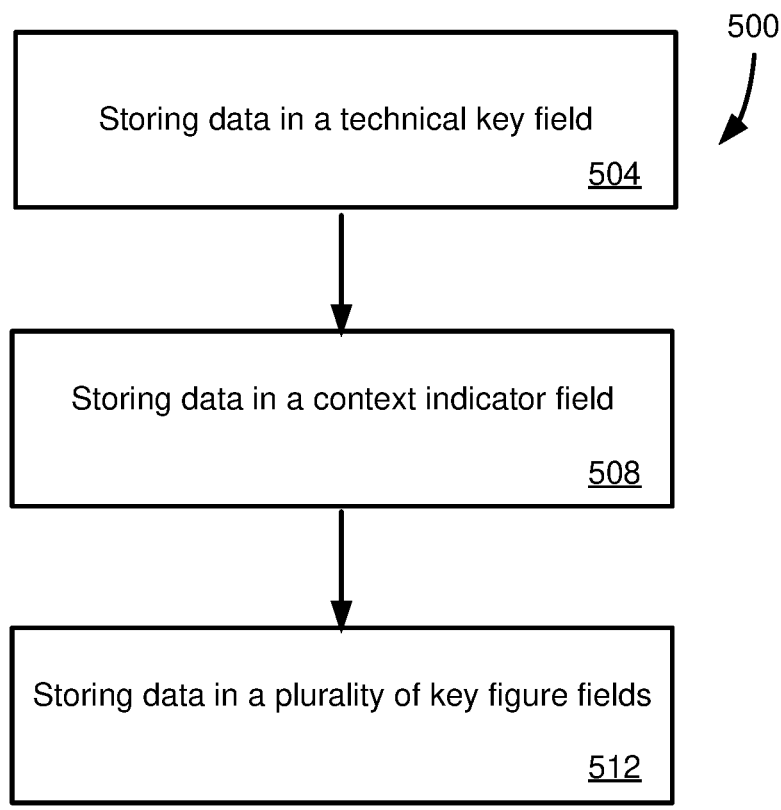
FIG. 5 is a flowchart of an example method of populating a contexed agglomerate table.

FIG. 5 is a flowchart depicting a method 500 of how a contexed agglomerate table, such as the contexed agglomerate table 404 of FIG. 4, can be formed. At 504, data is stored in a technical key field. Typically, one technical key field is used for all rows of the contexed agglomerate table, with each row having a unique value that serves as an identifier for the row. At 508, data is stored in a context indicator field for the contexed agglomerate table.

The contexed agglomerate table typically has a plurality of values for the context indicator field, which serve as identifiers for particular semantics. In some cases, a contexed agglomerate table can include multiple context indicator fields, which can allow a greater degree of control over semantic granularity. At 512, data is stored in a plurality of key figure fields. Each value of the context indicator field is typically associated with at least one key figure field that is unique to that value. Each context indicator field value can be associated with multiple unique key figure fields.

The method 500 can include additional steps, corresponding to populating the contexed agglomerate table with data for other types of fields. For example, the contexed agglomerate table can include one or more attribute fields. Attribute fields can be unique to a particular context indicator field value, or can be common to multiple, or all, context indicator field values. Thus, the method 500 can include storing attribute values in one or more attribute fields.

In addition to a technical key field, the contexed agglomerate table can include a (or in some cases a plurality of) semantic key fields. A semantic key field can be used, for example, to identify data (e.g., rows or records) in another database table. Thus, the semantic key field value can serve as a foreign key. The method 500 can include storing semantic key field values in the semantic key field.

Example 7—Example Query Results Using Contexed Agglomerate Table

Figure 6:
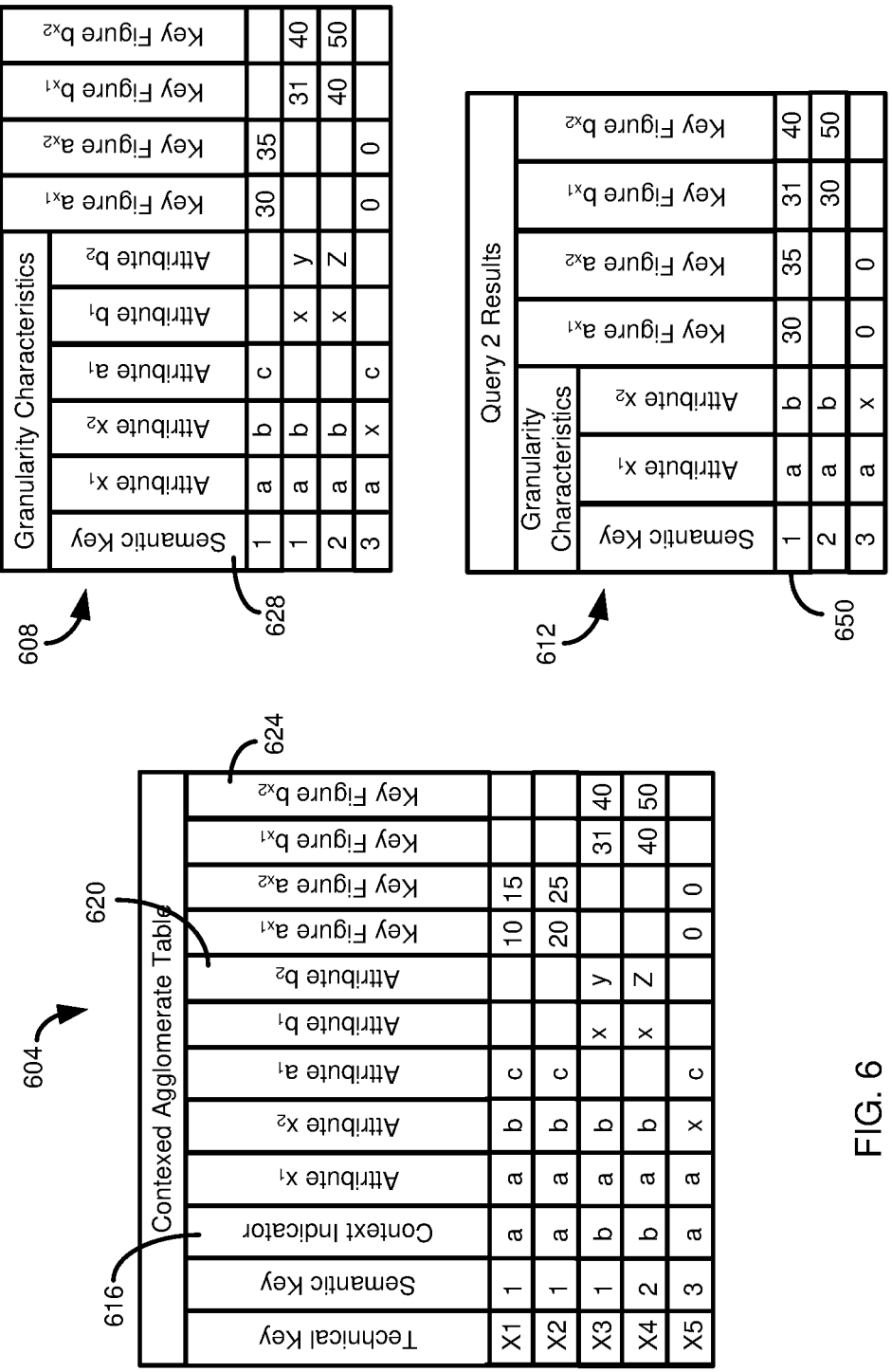
FIG. 6 is a diagram of an example contexed agglomerate table and example query execution results obtainable from the contexed agglomerate table.

FIG. 6 illustrates how different database queries can retrieve desired information from a contexed agglomerate table 604, which is generally similar to the contexed agglomerate table 404 of FIG. 4 (except that it omits row X6). Again, this format and content is by way of example, and the contexed agglomerate table 604 can have, for example, any desired number of rows, columns, number of context indicator field values 616 (or number of context indicator fields), number of attributes 620, and number of key figures 624. FIG. 6 illustrates results 608 of a first query and result 612 of a second query executed on the contexed agglomerate table 604.

As explained in Example 4, values of the context indicator field 616, one or more attributes fields 620, or combinations thereof, can be used to retrieve desired data from the contexed agglomerate table 604. Thus, the contexed agglomerate table 604 can be used to provide the same query results as normalized tables, but with lower complexity queries, and fewer database system requests.

The contexed agglomerate table 604 includes two values for context indicator field 616, 'a' and 'b'. Typically, a contexed agglomerate table will include a plurality of values for context indicator field 616, including more than two values. Query 1 and Query 2 each access data associated with both of the values of the context indicator field 616 of the contexed agglomerate table 604. However, a query can request data associated with any number of context indicator field values, including a single context indicator field value, multiple context indicator field values in the contexed agglomerate table (but less than all of the context indicator field values in the contexed agglomerate table), or with all of the values of the context indicator field in the contexed agglomerate table. Requesting data associated with multiple values of the context indicators field 616 can replicate more complex queries that would normally be executed on multiple normalized tables.

The results table 608 for Query 1 is shown as having a higher level of granularity than the results table 612 for Query 2. That is, the results table 608 preserves information that is lost in results table 612. In results table 608, rows X1 and X2 from contexed agglomerate table 604 have been combined (or aggregated), as they have the same value for the semantic key 628 and the same value for the context indicator field 616. Thus, the key figures 624 from rows X1 and X2 have been summed in a single row of the results table 608 for Query 1.

Results table 608 demonstrates that attributes 620 can serve as the granularity characteristics for the results (e.g., ways of distinguishing the key figure values associated with a particular row). It should be noted that the semantic context of the information in each row is maintained even though the context indicators field 616 is not present in the results table 608, and thus not used as a granularity characteristic. That is, as indicated by the titles of the attributes 620 and key figures 624, at least certain attributes and key figures are associated with a particular semantic context (e.g., attribute '$a_1$' is associated with context indicator field value 'a' and attribute '$b_1$' is associated with context indicator field value 'b'). In particular examples, at least some attributes 620, and possibly key figures 624, can be common to two or more semantics indicator field values. The presence of attributes 620 that are unique to particular semantic contexts (either a single semantic context or a subset of the available semantic contexts) allows the semantic information to be retained in the results table 608.

Results table 612 of Query 2 is show as more aggregated, having a lower (coarser) granularity, than results table 608 of Query 1. The information from the contexed agglomerate table 608 has been aggregated such that only the semantic key 628 and the attributes 620 common to both semantic contexts (e.g., attributes $x_1$ and $x_2$) remain for use as granularity characteristics. As with the results table 608, the values for the key figures 624 of rows X1 and X2 have been summed in row 650.

Row 650 also includes the values for key figures bk1 and bk2 of row X3 of contexed agglomerate table 604. Thus, all of the information associated with semantic key field value 1 is included in row 650. However, as the key figures 624 are correlated with the semantic context, data associated with a particular semantic can still be obtained from the table 612. As rows X4 and X5 of the contexed agglomerate table 604 are single rows for each of semantic IDs 2 and 3, their data is carried over to results table 612 as individual rows.

Example 8—Example Database Process Execution Using Contexed Agglomerate Table

Figure 7:
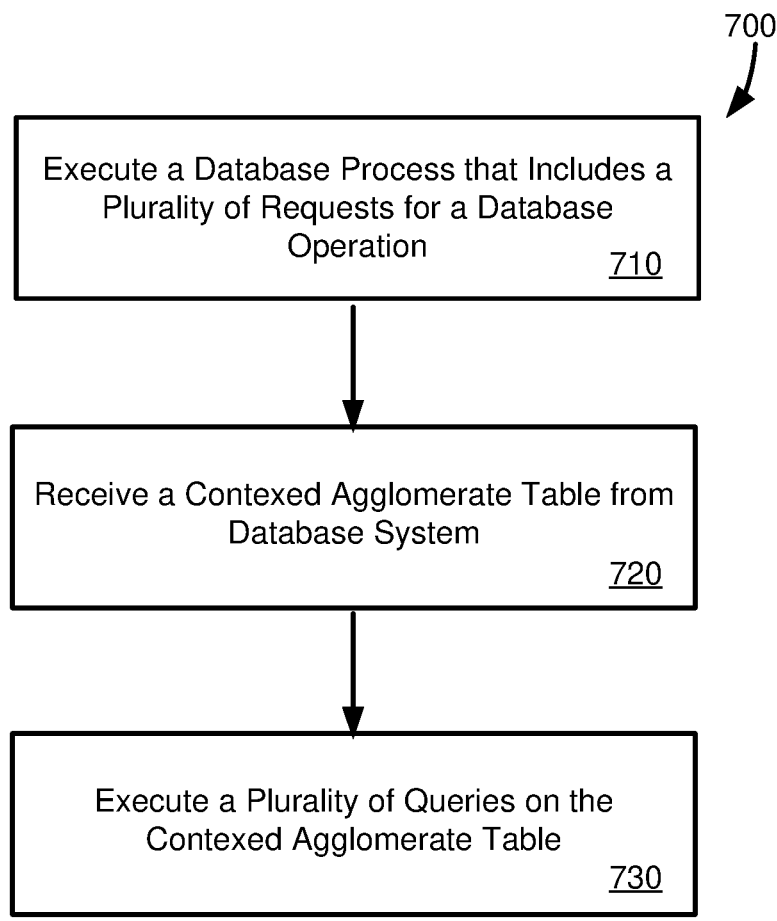
FIG. 7 is a flowchart of an example method for executing a database process using a contexed agglomerate table.

FIG. 7 provides a flowchart of a method 700 for carrying out a database process using a contexed agglomerate table. For example, the method 700 can be carried out by a logic layer or tier using a contexed agglomerate table provided by a data layer or tier (e.g., a database system). At 710, the database process is executed. The database process includes a plurality of requests for a database operation (e.g., queries, DML statements, or a combination thereof). At 720 a contexed agglomerate table is received from a database system.

The contexed agglomerate table can be a contexed agglomerate table described Examples 4-7. The contexed agglomerate table can include a context indicator field having a plurality of values. Each value can be associated with a unique semantic context. The contexed agglomerate table can also include a plurality of attribute fields and a plurality of key figure fields. Each context indicator field value is uniquely associated with at least one of the plurality of key figure fields.

At 730, a plurality of queries are executed on the contexed agglomerate table. Each of the plurality of queries comprises a different combination of one or more of the context indicator values, one or more of the attribute fields, or a combination thereof. Thus, different queries, directed to different semantic contexts and at the same level of granularity, or directed to the same semantic context(s) and at different levels of granularity can be executed against the same contexed agglomerate table. In particular examples, the contexed agglomerate table can be buffered to further increase performance.

Example 9—Example Database Architecture

Figure 8:
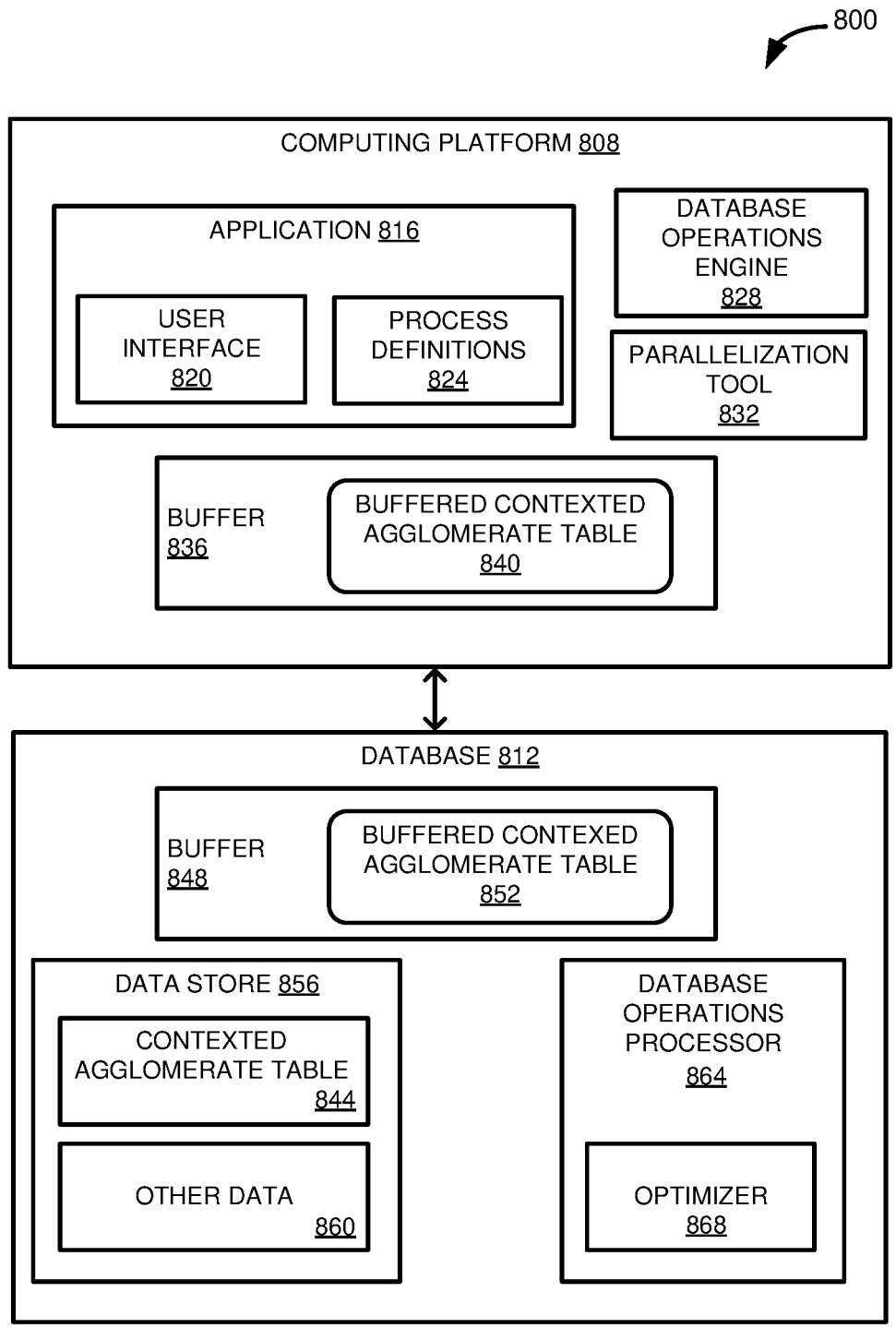
FIG. 8 is a schematic diagram of an architecture, including a computing platform and a database system, in which the disclosed innovations can be implemented.

FIG. 8 depicts an architecture 800 that can be used to implement the disclosed innovations. Generally, the architecture 800 includes a computing platform 808 and a database system 812. The computing platform 808 can be, for example, the S/4 HANA or S/4 HANA Cloud platform of SAP SE of Walldorf, Germany. The database system 812 can be, for example, the HANA database system of SAP SE of Walldorf, Germany. Although not shown, the architecture 800 can include additional components. For example, a client computing device may be in communication with the computing platform 808 or the database system 812.

The computing platform 808 can provide the logic tier 204 of FIG. 2. The computing platform 808 can include an application 816 that directs requests for database operations to, and receives results from, the database system 812. The application 816 can provide a user interface 820 to receive user input and provide information, such as query results or other information, to the user. The application 816 can also include process definitions 824 that can partially or totally automate certain activities involving the database system 812. For example, the process definitions 824 can include queries and DML statements to read and manipulate data according to particular, reoccurring needs, such as reports and calculations executed periodically, such as at the end of a day, week, month, quarter, year, or other defined period.

A database operations engine 828 can be included in the computing platform 808 (or, in some cases, the application 816). The database operations engine 828 can carry out requests for database operations specified by the process definitions 824, including issuing queries, receiving query results, and issuing DML statements. The queries can include requests to carry out calculations or aggregations of data of the database system 812, such as specified in the process definitions 824.

The database operations engine 828 can operate in cooperation with a parallelization tool 832, such as the Framework for Parallel Processing (FPP) of SAP SE of Walldorf, Germany. The parallelization tool 832 can split a process (or tasks or steps thereof) of the database operations engine 828 into a plurality of packages or jobs, at least a portion of which can be carried out concurrently. In addition to splitting database processes into multiple jobs or packages, the parallelization tool 832 can oversee task execution, and can combine tasks results to be returned by the database operations engine 828 to the application 816.

The database operations engine 828 can read and write to a buffer 836, the operation of which will be further described below. The buffer 836 can be structured as a contexed agglomerate table 840, such as having the same format as a contexed agglomerate table 844 stored by the database system 812 and accessed by the processes being executed by the database operations engine 828.

The database system 812 can also include a buffer 848. Like the buffer 836, the buffer 848 can be structured as a contexed agglomerate table 852, such as having the same format as the contexed agglomerate table 844 stored in the database system 812. The contexed agglomerate table 844 can be stored in a data store 856, which can store additional data 860. For example, the additional data 860 can include records (e.g., data corresponding to documents associated with a process of the process definitions 824) referenced by the contexed agglomerate table 844. For example, the contexed agglomerate table 844 can include foreign key values (e.g., the values of the semantic key field 424 of FIG. 4) that can be used to access records stored as additional data 860.

The database system 812 can include additional components. For example, the database system 812 can include a database operations processor 864. The database operations processor 864 can execute requests for database operations received from the computing platform 808, such as queries (including queries involving calculation or aggregation actions) and DML statements. Database operations, such as SQL statements, can be optimized by an optimizer component 868. The optimizer component 868 can, for a query, calculate an optimal query execution plan, determine whether such a plan has already been calculated, or update the execution plan.

Upon initiation of a process by the application 816, the database operations engine 828 can cause the contents of the contexed agglomerate table 844 of the database system 812 to be written to the buffered contexed agglomerate table 840 of the buffer 836. As part of the writing, the database operations processor 864 of the database system 812 can read data from the contexed agglomerate table 844 of the data store 856 and write it to the buffered contexed agglomerate table 852 of the buffer 848. The data from the buffered contexed agglomerate table 852 of the database system 812 can be sent to the computing platform 808. After being received, the data can be written to the buffered contexed agglomerate table 840, where it can be accessed by the database operations engine 828.

The use of the buffered contexed agglomerate table 840 at the computing platform 808 can help improve operational efficiency. For example, requests for database operations made by the database operations engine 828 can be executed against the buffered contexed agglomerate table 840, rather than having to be sent to the database system 812 for execution using the buffer contexed agglomerate table 852 or the contexed agglomerate table 844. Similarly, any changes to data, such as by DML statements, can be made to the buffered contexed agglomerate table 840 during process execution at the computing platform 808. When the process is completed (or, optionally, at one or more times during process execution), the changed data in the buffered contexed agglomerate table 840 can be sent by the computing platform 808 to the database system 812 where they can be written to the contexed agglomerate table 844 (optionally, first being written to the buffered contexed agglomerate table 852). The use of the buffered contexed agglomerate table 852 by the database system 812 can improve operations by making data more readily available for sending to the computing platform 808.

The architecture 800 can include more or fewer components than shown, and may be organized in other manners. For example, functionality of a particular component can be carried out by another component. In addition, in at least some cases, functionality can be carried out using multiple components. In a specific example, all or a portion of the functionality of the computing platform 808 and the database system 812 can be combined in a single system. Further, in some implementations, one or both of the buffer 836 and the buffer 848 can be omitted. For example, requests for a database operation can be sent by the computing platform 808 to be executed on the contexed agglomerate table 844.

Figure 9:
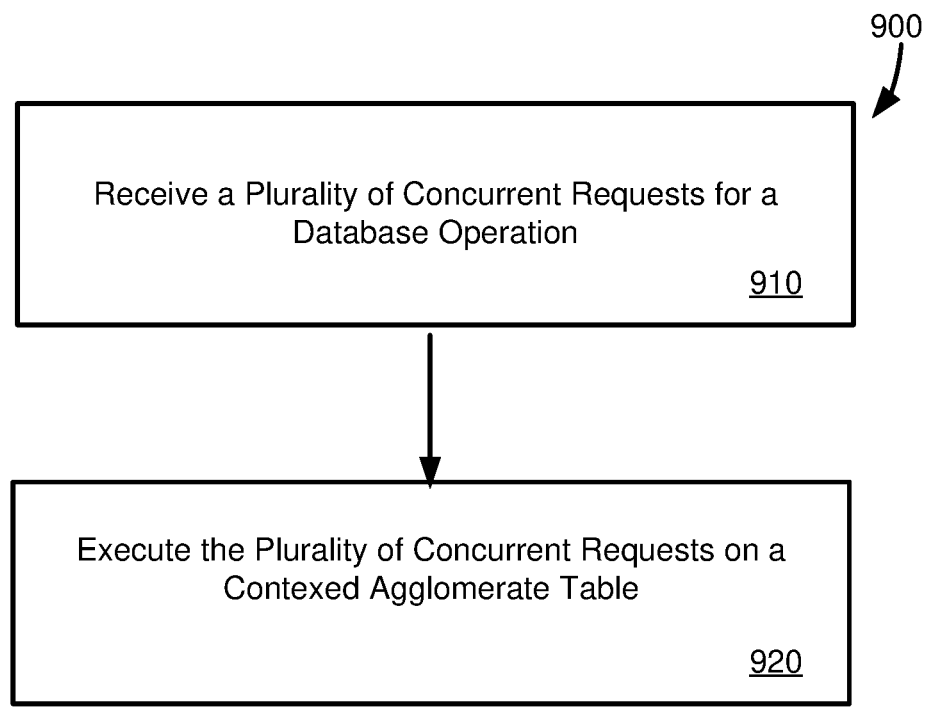
FIG. 9 is a flowchart of an example method for concurrently executing a plurality of requests for a database operation using a contexed agglomerate table.

Example 10—Example Concurrent Execution of Requests for a Database Operation Using a Contexed Agglomerate Table FIG. 9 is a flowchart of an example method 900 of executing a plurality of concurrent requests for a database operation using a contexed agglomerate table. At 910, a plurality of concurrent requests for a database operation are received. The plurality of concurrent requests for a database operation may be associated with a database process. For example, the plurality of concurrent requests may result from parallelization of the database process.

The plurality of concurrent requests for a database operation are executed on the contexed agglomerate table at 920. The contexed agglomerate table can include a context indicator field having a plurality of values. Each value can be associated with a unique semantic context. The contexed agglomerate table can also include a plurality of attribute fields and a plurality of key figure fields. Each context indicator value is uniquely associated with at least one of the plurality of key figure fields.

For at least a portion of the plurality of concurrent requests, the portion itself comprises multiple concurrent requests, and each of the plurality of requests for a database operation comprises a different combination of one or more of the plurality of context indicator values, one or more of the plurality of attribute fields, or a combination thereof. Thus, different queries, directed to different semantic contexts and at the same level of granularity, or directed to the same semantic context(s) and at different levels of granularity, can be executed against the same contexed agglomerate table. In a particular example, the contexed agglomerate table can be buffered to further increase performance.

Figure 10:
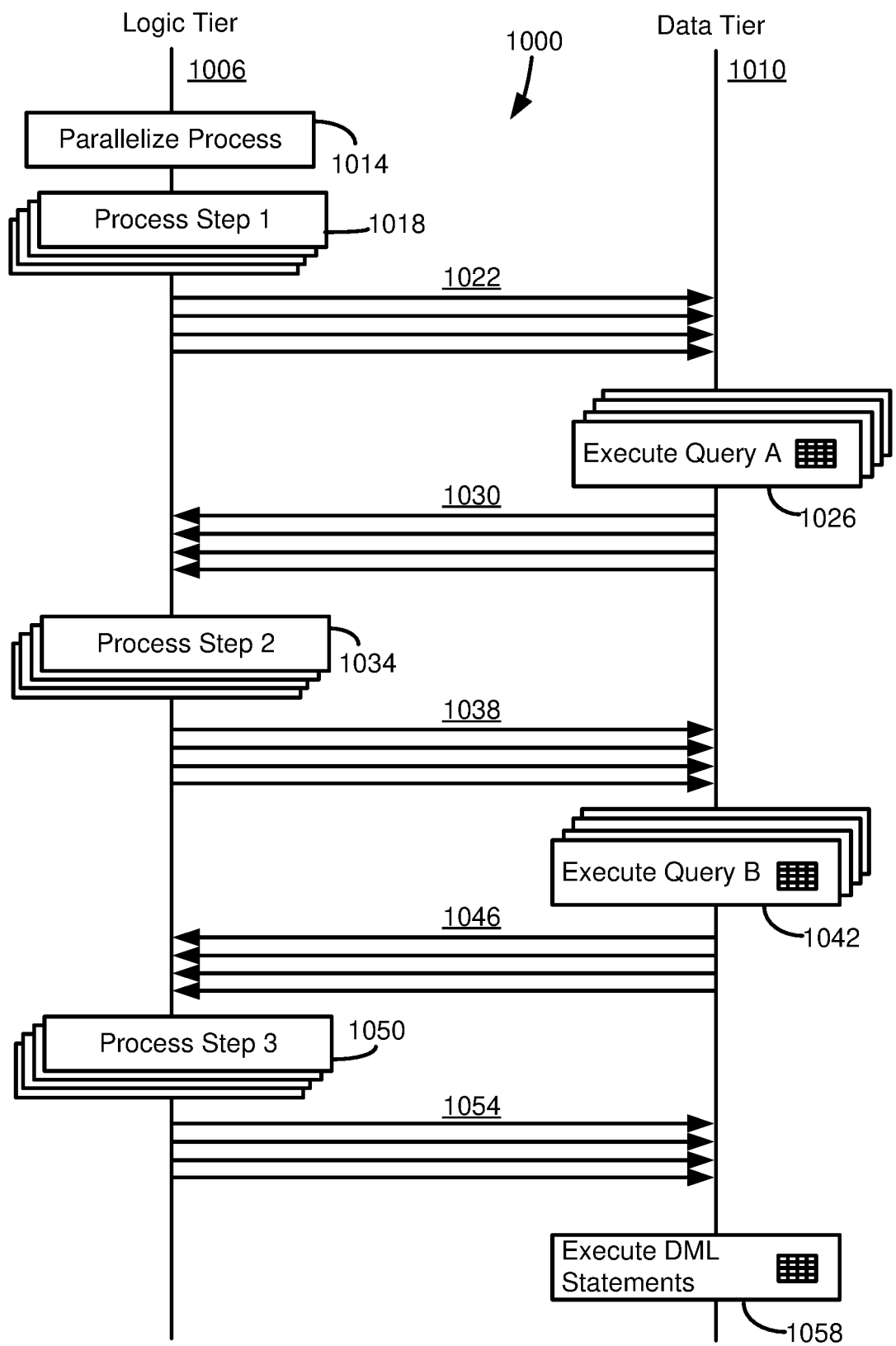
FIG. 10 is a diagram illustrating operations at a logic tier and a data tier during concurrent execution of operations for a parallelized process using a contexed agglomerate table of a database system.

Example 11—Example Database Process Execution with Concurrent Operations at Data Tier FIG. 10 is diagram illustrating an example process 1000 for executing a database process. The process 1000 has operations occurring at a logic tier 1006 (e.g., the computing platform 808 of FIG. 8) and a data tier 1010 (e.g., the database system 812) according to an embodiment of the present disclosure. For example, the operations can be those carried out during execution of a database process using a contexed agglomerate table maintained at the data tier 1010.

At 1014, the process is parallelized at the logic tier 1006, such as using the parallelization tool 832. The logic tier 1006 executes process step 1 at 1018. 1018 is carried out concurrently for multiple parallel tasks. The logic tier 1006 issues a plurality of requests 1022 for a database operation to the data tier 1010.

At 1026, the data tier 1010 executes a Query A associated with process step 1. Query execution at 1026 is carried out concurrently for a plurality of the requests 1022. The queries are carried out using a contexed agglomerate table. Thus, although FIG. 10 involves multiple requests 1022 to be executed at the data tier 1010, compared with the process 200 of FIG. 2, the process 1000 of FIG. 10 provides a reduced workload at the data tier 1010, as the single contexed agglomerate table is accessed for the queries, rather than a plurality of normalized tables as in FIG. 2. Query execution results 1030 are returned to the logic tier 1006 by the data tier 1010.

At 1034, the logic tier 1006 executes process step 2. The logic tier 1006 issues a plurality of requests 1038 for a database operation to the data tier 1010. At 1042, the data tier 1010 executes a Query B associated with process step 2. Query execution at 1042 is carried out concurrently for a plurality of the requests 1022 using the contexed agglomerate table. Query execution results 1046 are returned to the logic tier 1006 by the data tier 1010.

The logic tier 1006 executes process step 3 at 1050. The logic tier 1006 issues a plurality of requests 1054 for a database operation to the data tier 1010. The data tier 1010 executes a plurality of DML statements associated with process step 3 at 1058. In at least some cases, the DML statements can be grouped into a single transaction to be executed on the contexed agglomerate table.

Figure 11:
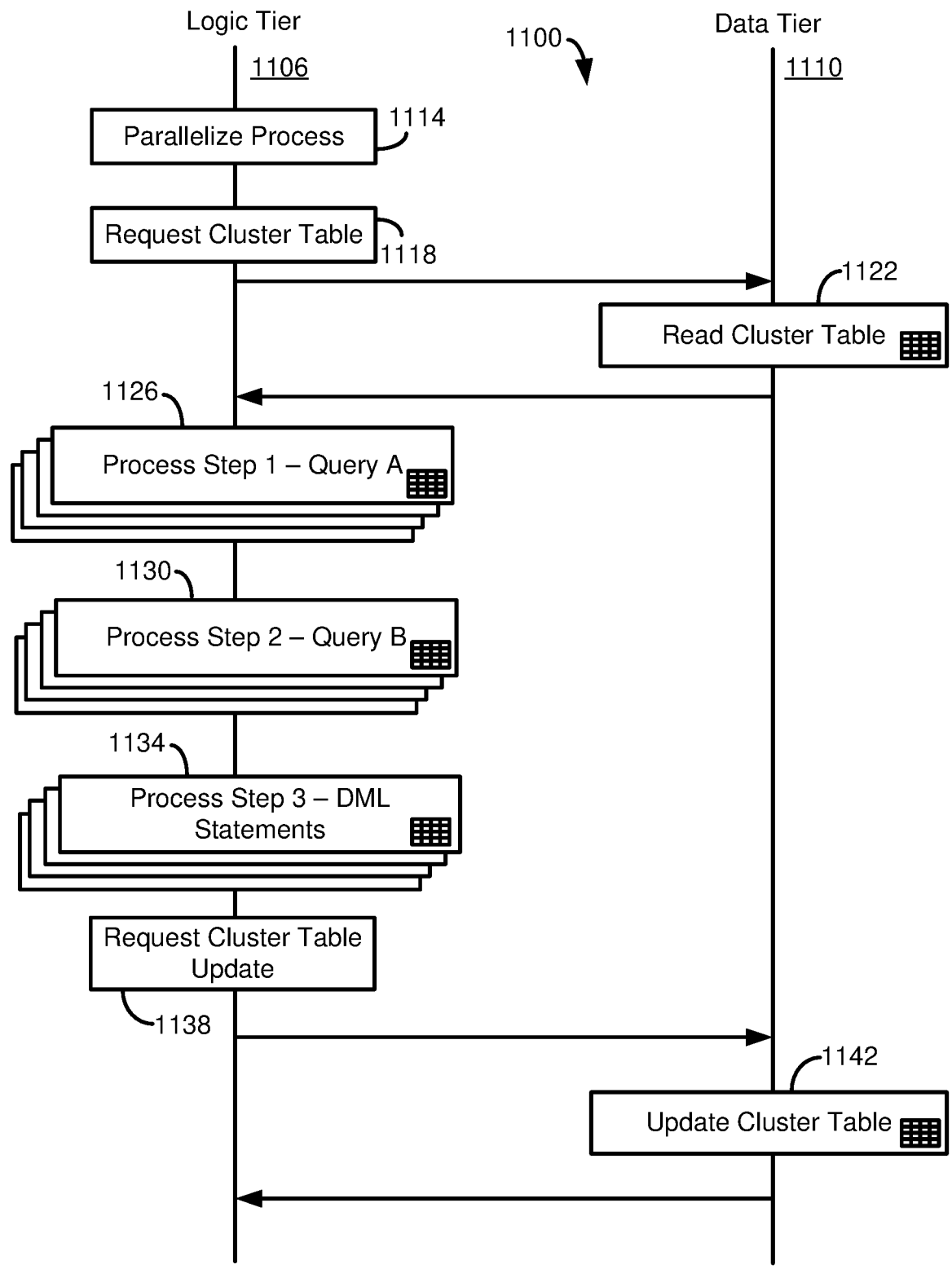
FIG. 11 is a diagram illustrating operations at a logic tier and a data tier during concurrent execution of operations for a parallelized process using a buffered contexed agglomerate table of the logic tier.

Example 12—Example Database Process Execution with Buffered Contexed Agglomerate Table at Logic Tier FIG. 11 is a flowchart of an example process 1100 involving the execution of a database process at a logic tier 1106 using a contexed agglomerate table read from a data tier 1110. For example, the logic tier 1106 may operate on a buffered contexed agglomerate table maintained in a buffer of the logic tier.

At 1114, a database process is parallelized, such as into multiple tasks, each having multiple packages. At 1118, the logic tier 1106 requests all or a portion of a contexed agglomerate table maintained by the data tier 1110. For example, the logic tier 1106 may issue a query to retrieve data from the contexed agglomerate table. The data tier 1110 reads the contexed agglomerate table at 1122 and returns the requested data to the logic tier 1106. In at least some cases, the logic tier 1106 can receive the data (referred to as the contexed agglomerate table) in a buffer.

At 1126 and 1130, the logic tier 1106 can execute, respectively, process steps 1 and 2, including Queries A and B. The queries (and any other database operations associated with the process steps) can be executed on the buffered contexed agglomerate table of the logic tier 1106. Thus, in addition to accessing a single table, rather than multiple tables, only one communication between the logic tier 1106 and the data tier 1110 is required for the process steps to be executed.

A process step 3 is executed at the logic tier 1106 at 1134. Process step 3 can involve the execution of a plurality of DML statements on the buffered contexed agglomerate table of the logic tier 1106. The logic tier 1106, at 1138, can request an update to the contexed agglomerate table of the data tier 1110. For example, the update may be sent as a single DML statement (e.g., INSERT operation) or transaction. The update is executed on the contexed agglomerate table of the data tier 1110 at 1142. The data tier 1110 can return an acknowledgment of the update, such as a commit notification, to the logic tier 1106 to indicate that the update was successfully applied.

Writing to a single table, in a single transaction or statement, can reduce communications between the logic tier 1106 and the data tier 1110, as well as lowering the operational complexity of carrying out the update at 1142.

Example 13—Example Technical Solution

The technical solution can provide a contexed agglomerate table that can improve the performance of a database system, and other systems and components interacting with the database system. Using multiple, normalized tables can increase the number of requests to a database system, as well as the complexity of the requests. The disclosed contexed agglomerate tables can reduce the number of requests, which can improve scalability and lower resource use, such as reducing CPU use or network use in transmitting data between the database system and another system or component (e.g., a computing platform or application).

The number of requests can be further reduced by buffering the contexed agglomerate table on the computing device requesting the execution of a database process. For example, the contexed agglomerate table can be buffered on a computing platform operating an application that requests the execution of the database process. Rather than sending multiple read and write requests to be carried out by the database system, the contexed agglomerate table can be read to the buffer, read and write operations carried out on the buffered contexed agglomerate table, and any changes to the buffered contexed agglomerate table sent to the database system to be used to update the contexed agglomerate table stored on the database system.

The use of the contexed agglomerate table can provide additional technical solutions. For example, using a single table can allow for higher compression rates to be used, which can reduce the stored volume of data. A single table can also allow for fewer and shorter fields, such as technical key fields, to be used, also reducing data volume. The use of a single table can allow for aggregated reading of table rows, reducing the number of lines to be transferred.

Example 14—Example Feature: Buffered Contexed Agglomerate Tables

In any of the inventive examples herein, a contexed agglomerate table can be buffered to increase system performance. For example, the contexed agglomerate table can be buffered at a computing platform, at a database system, or at both the computing platform and the database system. At the computing platform, the buffered contexed agglomerate table can improve performance by requiring fewer data transfers between the computing platform and the database system. At the database system, the buffered contexed agglomerate table can speed operations, as data can provided without accessing the database server.

Example 15—Example Computing Systems

Figure 12:
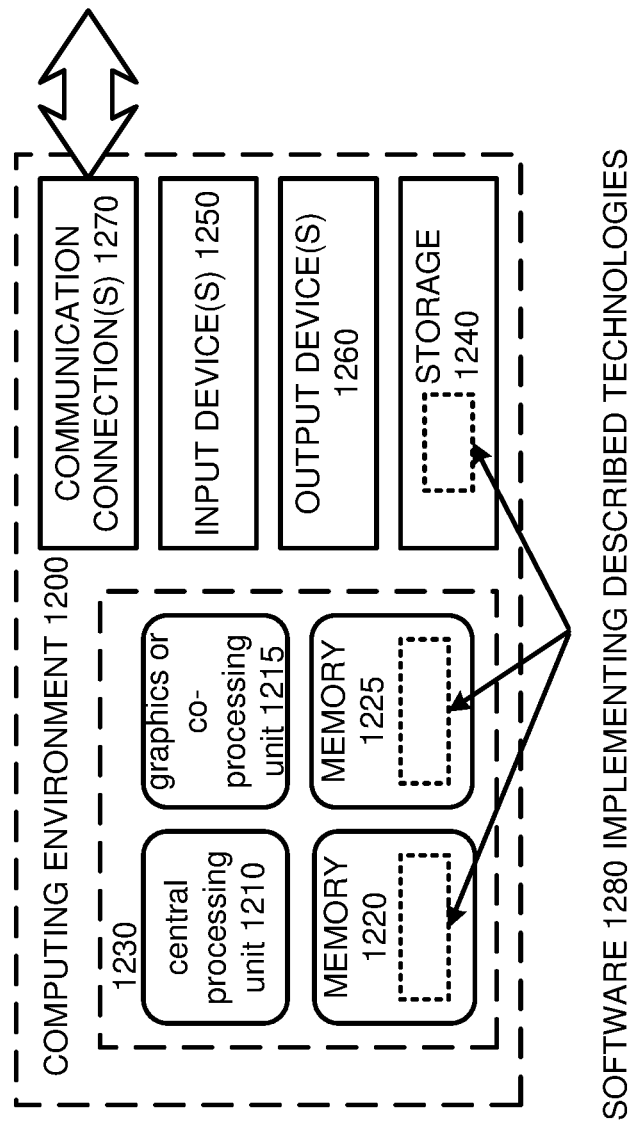
FIG. 12 is a diagram of an example computing system in which described embodiments can be implemented.

FIG. 12 illustrates a generalized example of a suitable computing system 1200 in which several of the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s). The memory 1220, 1225 can also store encoded data providing a contexed agglomerate table.

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein, and can store encoded data providing a contexed agglomerate table. The storage 1240 does not include signals per se.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Example Cloud-Supported Environment

Figure 13:
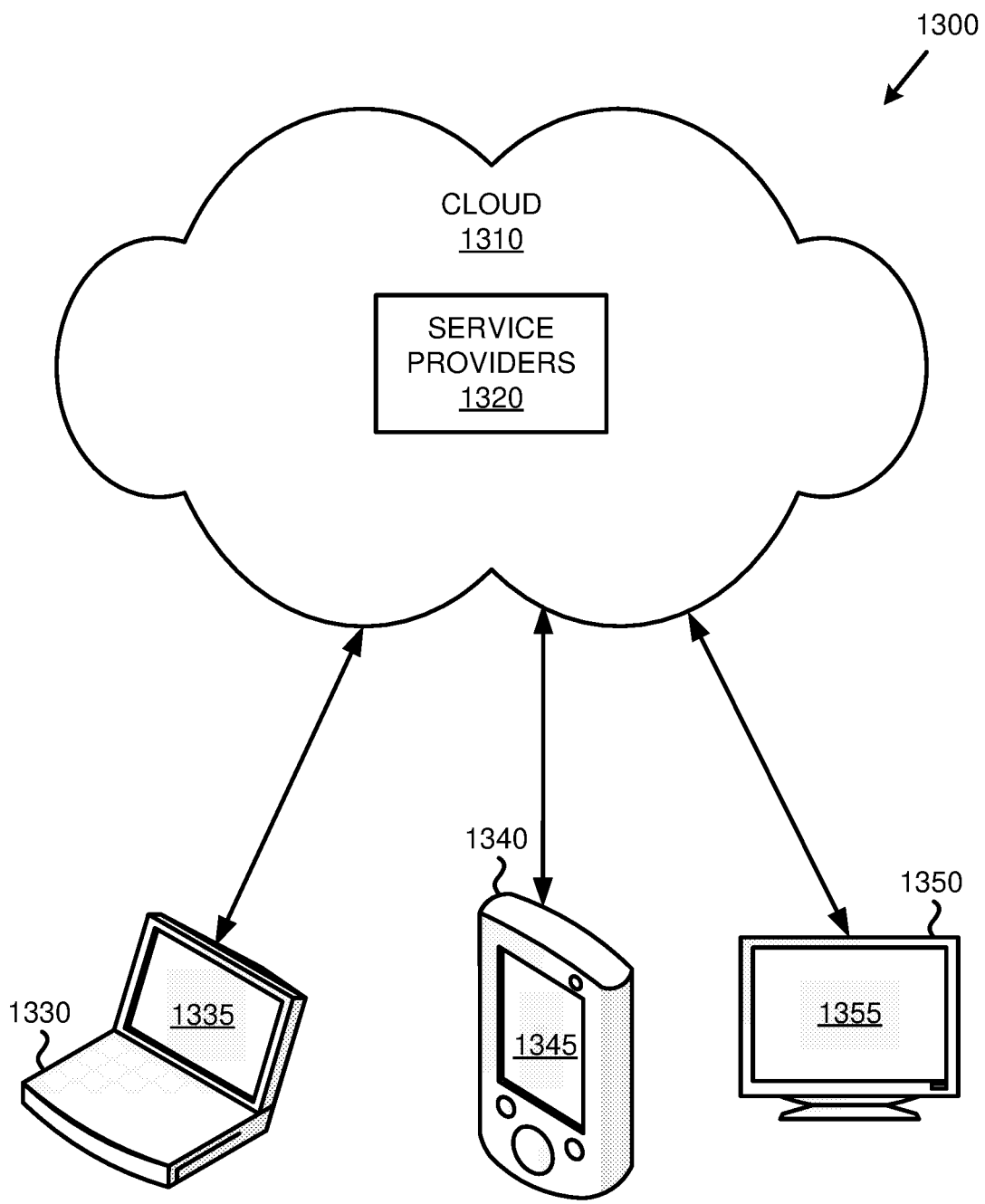
FIG. 13 is an example cloud-support environment that can be used in conjunction with the technologies described herein.

In example environment 1300 of FIG. 13, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. The connected device 1340 represents a device with a mobile device screen 1345 (e.g., a small size screen). For example, the connected device 1340 could be a mobile phone, smart phone, personal digital assistant, tablet computer, and the like. The connected device 1350 represents a device with a large screen 1355. For example, the connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Example 17—Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 18—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. A computing system storing a table having a table schema that facilitates data denormalization to provide enhanced query performance, the computing system comprising:
   at least one hardware processor;
   at least one memory coupled to the at least one hardware processor; and
   one or more computer-readable storage media storing computer-executable instructions that, when executed, cause the computing system to perform operations that facilitate data denormalization to provide improved database query processing, the operations comprising:
      receiving instructions to define a plurality of attribute columns in a table;
      receiving instructions to define a first row identifier column in the table, the first row identifier column not being an attribute column of the plurality of attribute columns, wherein values of the first row identifier column uniquely identify rows of the table;

receiving instructions to define an attribute subset identifier column in the table, the attribute subset identifier column not being a column of the plurality of attribute columns and being different than the first row identifier column, wherein values of the attribute subset identifier column identify different subsets of the plurality of attribute columns;

generating a plurality of rows for the table by receiving sets of values for one or more attribute columns of the plurality of attribute columns, the first row identifier column, and the attribute subset column;

receiving a database query requesting at least a portion of values stored in the table, the database query comprising one or more values for the attribute subset identifier column;

identifying rows of the table comprising the one or more values for the attribute subset identifier column to provide one or more identified rows; and returning at least a portion of attribute values of the one or more identified rows in response to the database query.

2. The computing system of claim 1, the operations further comprising:

receiving instructions to define a second row identifier column in the table, wherein the second row identifier column is defined with respect to a combination of one or more columns of the plurality of attribute columns, such that values of the combination of one or more columns form a value of the second row identifier column and identify one or more rows of the table.

3. The computing system of claim 2, wherein values of the second row identifier column correspond to primary key values of another table or a view.

4. The computing system of claim 2, wherein the table comprises a plurality of rows having a common value for the second row identifier column.

5. The computing system of claim 4, wherein at least a portion of the plurality of rows having the common value for the second row identifier column have a common value for the attribute subset identifier column.

6. The computing system of claim 4, wherein at least one row having the common value for the second row identifier column has a different value for the attribute subset identifier column than at least another row of the plurality of rows having the common value for the second row identifier column.

7. The computing system of claim 1, wherein the plurality of attributes correspond to dimensions.

8. The computing system of claim 7, the table further comprising one or more measure columns.

9. The computing system of claim 8, wherein a plurality of rows of the table comprise identical values for the plurality of attributes columns for which the rows have values, have a common attribute subset identifier column value, and comprise different values for at least one measure column of the one or more measure columns.

10. The computing system of claim 9, wherein subsets of the plurality of attributes correspond to attributes of different entity types and the measure columns are not attributes of the different entity types.

11. The computing system of claim 9, wherein the query specifies an aggregation of values for the at least one measure column of the one or more measure columns and a value for the attribute subset identifier column.

12. The computing system of claim 11, wherein the query specifies a value for at least one attribute column of the plurality of attribute columns and aggregation is performed for rows of the table having the attribute value.

13. The computing system of claim 9, wherein a query can be used to aggregate values of the one or more measure columns for rows of the table having a common value for the attribute subset identifier column and the aggregation can be specified at different levels of granularity based on a number of attributes of the plurality of attributes for which one or more values are specified in a query.

14. The computing system of claim 1, wherein subsets of the plurality of attribute columns correspond to attributes of different entity types.

15. The computing system of claim 1, wherein the database query does not comprise identifiers for attribute columns of the plurality of attribute columns.

16. The computing system of claim 1, wherein a first subset of the plurality of subsets comprises a first attribute column that is part of a second subset of the plurality of subsets and a second attribute column that is not part of the second subset of the plurality of subsets.

17. The computing system of claim 1, wherein a first subset of the plurality of subsets comprises one or more attribute columns that are not part of a second subset of the plurality of attribute columns.

18. One or more non-transitory computer-readable storage media comprising:

computer-executable instructions that, when executed by a computing system comprising at least one memory and at least one hardware processor coupled to the at least one memory, cause the computing system to receive instructions to define a plurality of attribute columns in a table;

computer-executable instructions that, when executed by the computing system, cause the computing system to receive instructions to define a first row identifier column in the table, the first row identifier column not being an attribute column of the plurality of attribute columns, wherein values of the first row identifier column uniquely identify rows of the table;

computer-executable instructions that, when executed by the computing system, cause the computing system to receive instructions to define an attribute subset identifier column in the table, the attribute subset identifier column not being a column of the plurality of attribute columns and being different than the first row identifier column, wherein values of the attribute subset identifier column identify different subsets of the plurality of attribute columns;

computer-executable instructions that, when executed by the computing system, cause the computing system to generate a plurality of rows for the table by receiving sets of values for one or more attribute columns of the plurality of attribute columns, the first row identifier column, and the attribute subset column;

computer-executable instructions that, when executed by the computing system, cause the computing system to receive a database query requesting at least a portion of values stored in the table, the database query comprising one or more values for the attribute subset identifier column;

computer-executable instructions that, when executed by the computing system, cause the computing system to identify rows of the table comprising the one or more values for the attribute subset identifier column to provide one or more identified rows; and computer-executable instructions that, when executed by the computing system, cause the computing system to return at least a portion of attribute values of the one or more identified rows in response to the database query.

19. A method, implemented in a computer system comprising at least one hardware processor and at least one memory coupled to the at least one hardware processor, the method comprising:

receiving instructions to define a plurality of attribute columns in a table;

receiving instructions to define a first row identifier column in the table, the first row identifier column not being an attribute column of the plurality of attribute columns, wherein values of the first row identifier column uniquely identify rows of the table;

receiving instructions to define an attribute subset identifier column in the table, the attribute subset identifier column not being a column of the plurality of attribute columns and being different than the first row identifier column, wherein values of the attribute subset identifier column identify different subsets of the plurality of attribute columns;

generating a plurality of rows for the table by receiving sets of values for one or more attribute columns of the plurality of attribute columns, the first row identifier column, and the attribute subset column;

receiving a database query requesting at least a portion of values stored in the table, the database query comprising one or more values for the attribute subset identifier column;

identifying rows of the table comprising the one or more values for the attribute subset identifier column to provide one or more identified rows; and returning at least a portion of attribute values of the one or more identified rows in response to the database query.

20. The method of claim 19, wherein a query can be used to aggregate values of one or more measure columns for rows of the table having a common value for the attribute subset identifier column and the aggregation can be specified at different levels of granularity based on a number of attributes of the plurality of attributes for which one or more values are specified in a query.

* * * * *